(12) United States Patent
van der Mee et al.

(10) Patent No.: US 8,440,762 B2
(45) Date of Patent: May 14, 2013

(54) POLYMER COMPOSITIONS, METHOD OF MANUFACTURE, AND ARTICLES FORMED THEREFROM

(75) Inventors: Mark van der Mee, Breda (NL); Josephus Gerardus M. van Gisbergen, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 190 days.

(21) Appl. No.: 13/007,031

(22) Filed: Jan. 14, 2011

(65) Prior Publication Data

US 2012/0184662 A1   Jul. 19, 2012

(51) Int. Cl.
*C08K 3/34*   (2006.01)
*C08K 3/26*   (2006.01)

(52) U.S. Cl.
USPC ............ 524/537; 524/449; 524/451; 524/508

(58) Field of Classification Search .................. 524/449, 524/451, 508, 537
See application file for complete search history.

(56) References Cited

U.S. PATENT DOCUMENTS

| | | | |
|---|---|---|---|
| 3,189,662 A | 6/1965 | Vaughn, Jr. | |
| 3,419,635 A | 12/1968 | Vaughn et al. | |
| 3,855,277 A | 12/1974 | Fox | |
| 4,161,498 A | 7/1979 | Bopp | |
| 5,605,980 A * | 2/1997 | Boutni et al. | 525/439 |
| 5,882,780 A | 3/1999 | Yamamura et al. | |
| 6,072,011 A | 6/2000 | Hoover et al. | |
| 6,444,283 B1 | 9/2002 | Turner et al. | |
| 6,518,322 B1 | 2/2003 | West | |
| 6,569,957 B2 | 5/2003 | Williams et al. | |
| 6,706,843 B1 | 3/2004 | Ishihara et al. | |
| 6,794,463 B2 | 9/2004 | Aramaki et al. | |
| 6,890,213 B2 | 5/2005 | Ohtsuki | |
| 7,067,567 B2 | 6/2006 | Seidel et al. | |
| 2005/0143508 A1 | 6/2005 | Tyagi et al. | |
| 2006/0142455 A1 | 6/2006 | Agarwal et al. | |
| 2008/0132641 A1* | 6/2008 | Li et al. | 525/67 |
| 2008/0242789 A1 | 10/2008 | Zhu et al. | |
| 2008/0246181 A1* | 10/2008 | Zhu et al. | 264/239 |

FOREIGN PATENT DOCUMENTS

| | | |
|---|---|---|
| EP | 0465924 A2 | 6/1991 |
| EP | 0510958 B1 | 4/1992 |
| EP | 0 510 958 A1 * | 10/1992 |
| WO | 2008/063724 A1 | 5/2008 |

OTHER PUBLICATIONS

The International Searching Authority, International Search Report, PCT/IB2012/050181, date of mailing: May 24, 2012, 4 pages.
The International Searching Authority, Written Opinion, PCT/IB2012/050181, date of mailing: May 24, 2012, 6 pages.
ASTM D1003-00; Standard Test Method for Haze and Luminous Transmittance of Transparent Plastics; Jun. 25, 2004; 6 pages.
ASTM D1238-04; Standard Test Method for Melt Flow Rates of Thermoplastics by Extrusion Plastometer; Jul. 25, 2007; 14 pages.
ASTM D256-04; Standard Test Methods for Determining the Izod Pendulum Impact Resistance of Plastics; Aug. 18, 2004; 20 pages.
ISO 1133; International Standard; Plastics—Determination of the melt mass-flow rate (MFR) and the melt volume-flow rate (MVR) of thermoplastics; Jun. 1, 2005; 20 pages.
ISO 11443; International Standard; Plastics—Determination of the fluidity of plastics using capillary and slit-die rheometers; Mar. 1, 2005; 40 pages.
ISO 180; International Standard; Plastics—Determination of Izod imact strength; Dec. 15, 2000; 16 pages.
ISO 527; International Standard; Plastics—Determination of tensile properties Part 1; Jun. 15, 1993; 54 pages.
ISO 6603-2; International Standard; Plastics—Determination of puncture impact behaviour of rigid plastics—Part 2: Instrumented impact testing; Oct. 1, 2000, 28 pages.

* cited by examiner

*Primary Examiner* — Ling Choi
*Assistant Examiner* — Ronald Grinsted
(74) *Attorney, Agent, or Firm* — Cantor Colburn LLP

(57) ABSTRACT

Disclosed herein is a thermoplastic composition comprising, based on the total weight of the composition: (a) from 10 to 80 wt. % of a polybutylene terephthalate; (b) from 10 to 80 wt. % of a copolyestercarbonate component, comprising a first copolyestercarbonate having a number average molecular weight of 15,000 to less than 28,000 Daltons, and a second copolyestercarbonate having a number average molecular weight of more than 28,000 to 40,000 Daltons, wherein a weight ratio of the first polyestercarbonate to the second polyestercarbonate is 95:5 to 20:80; (c) from 3 to 30 wt. % of a particulate filler; (d) from 0.1 to 10 wt. % of a fluoropolymer; and (e) from 3 to 25 wt. % of a polymeric impact modifier. A method of making the composition and an article comprising the thermoplastic composition are also disclosed.

27 Claims, 1 Drawing Sheet

POLYMER COMPOSITIONS, METHOD OF MANUFACTURE, AND ARTICLES FORMED THEREFROM

BACKGROUND OF THE INVENTION

This invention is directed to thermoplastic compositions having an improved balance of melt viscosity and impact strength, and in particular to thermoplastic compositions comprising a copolyestercarbonate copolymer, and articles prepared therefrom.

Polycarbonates are amorphous polymers noted for their optical properties, thermal resistance, toughness, and impact resistance. High flow polycarbonates, polyesters, and other polymers, typically those having low molecular weights and are available for the injection molding of parts with very thin dimensions and long flow lengths.

Copolyestercarbonates, having both ester and carbonate repeat units, are known to have polycarbonate-like properties together with substantially increased flow at the same molecular weight as an ordinary aromatic polycarbonate. EP 0510 958 B1 and U.S. Pat. No. 5,605,980, for examples discloses a composition comprising bisphenol-A-copolyestercarbonates having dodecanedioate content with improved melt flow compared to polycarbonates of the same molecular weights. EP 0510 958 B1 does not disclose examples of compositions comprising polyesters, impact modifiers, fillers, or fluoropolymers.

Although enhanced flow allows more rapid molding operations, as well as molding of large and/or complex articles, common methods to do this, such as lowering molecular weights of one or more polymer components of the composition or the addition of flow promoters, have their limitations, as they generally negatively influence other desired properties, especially impact properties.

It is undesirable for the impact strength of the polycarbonate and other mechanical properties (elongation at break, fatigue stress, and the like) to be compromised. Thin-wall and complex injection molded parts with minimal residual stress and low temperature ductility are therefore not readily prepared from existing polycarbonate materials and polymer blends.

Furthermore, in order to obtain thermoplastic compositions with enhanced modulus/stiffness, commonly reinforcing fillers are added to the composition, such as glass fibers, aramid fibers, carbon fibers, and various mineral fillers. However, in most cases, the addition of these fillers leads to brittle failure of the polymer and to lower impact strength. Additionally, processing problems can occur, due to incompatibility between the polymer matrix and the filler.

WO 2008/063724 discloses blends of a polyester with at least two different copolyester carbonates, which comprise arylate ester units. Blends of polyesters and polycarbonates are also known. An alloy or blend of polyester with polycarbonate can offer some improvements with respect to the properties of polycarbonates. For example, alloys of a polycarbonate, a polyester such as polyalkylene terephthalate, and an emulsion-ABS graft copolymer are disclosed in U.S. Pat. No. 7,067,567. This patent discloses a flame resistant polymer composition containing no chlorine or bromine elements and improved weld line strength for molding.

U.S. Patent Publications 2005/0143508 and 2006/0142455 describe particular polymer compositions that give optimum balance of mechanical properties, especially high modulus combined with good ductility and impact strength. These compositions contain a matrix polymer component and a combination of fluoropolymer and mineral filler. U.S. Patent Publications 2008/0242789 and 2008/0246181 describe specific polymer compositions containing a blend of polyesters and polycarbonates and a combination of mineral filler and fluoropolymer, which again have an optimum balance of impact and modulus.

Another family of well-known polycarbonate copolymers are the polycarbonate-polysiloxane copolymers (see for instance U.S. Pat. Nos. 3,189,662 and 3,419,635). U.S. Pat. No. 6,072,011 describes a specific class of compositions of these copolymers that have both improved processing characteristics and improved low temperature impact properties.

It would be desirable to obtain thermoplastic compositions having a superior balance of properties combined with enhanced flow characteristics. Modification of the molecular weights of the thermoplastic components of these compositions can yield some flow improvements without losing too much impact properties, but further improvements in both melt flow and impact strength are desired.

In view of the above, a need exists for polymer compositions that have improved combinations of properties, such as higher modulus or impact strength, in addition to improved melt flow characteristics. It is especially difficult to obtain high modulus, good melt flow characteristics, and good impact strength, all in a single thermoplastic composition.

BRIEF SUMMARY OF THE INVENTION

A thermoplastic composition comprises, based on the total weight of the composition:
(a) from 10 to 80 wt. % of a polybutylene terephthalate;
(b) from 10 to 80 wt. % of a copolyestercarbonate component, comprising
a first copolyestercarbonate having a number average molecular weight of 15,000 to less than 28,000 Daltons, and
a second copolyestercarbonate having a number average molecular weight of more than 28,000 to 40,000 Daltons,
wherein a weight ratio of the first polyestercarbonate to the second polyestercarbonate is 95:5 to 20:80, and
wherein each copolyestercarbonate comprises structural estercarbonate units of the formula:

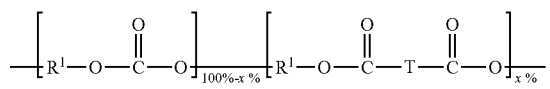

wherein
each $R^1$ is independently the same or different $C_{6-30}$ aromatic group,
each T is independently the same or different $C_{2-16}$ alkylene group, and
x is the mole % of ester units in the copolyestercarbonate based on the total mole % of ester and carbonate units, and is 1 to 10, wherein the ester and carbonate units represent at least 90 mole % of the polyestercarbonate;
(c) from 3 to 30 wt. % of a particulate filler;
(d) from 0.1 to 10 wt. % of a fluoropolymer;
(e) from 3 to 25 wt. % of a polymeric impact modifier;
(f) from 0 to 5 wt. % of an additive selected from the group consisting of an antioxidant, mold release agent, colorant, quencher, stabilizer, and combination thereof; and
(g) from 0 to 30 wt. % of a polycarbonate;

In another embodiment, a thermoplastic composition comprises, based on the total composition:
(a) from 20 to 70 wt. % of a polybutylene terephthalate;
(b) from 20 to 70 wt. % of a copolyestercarbonate component, comprising
a first copolyestercarbonate having a number average molecular weight of 18,000 to less than 25,000 Daltons, and
a second copolyestercarbonate having a number average molecular weight of more than 32,000 to 38,000 Daltons,
wherein a weight ratio of the first polyestercarbonate:second polyestercarbonate is 95:5 to 20:80 and
wherein each copolyestercarbonate comprises structural estercarbonate units of the formula:

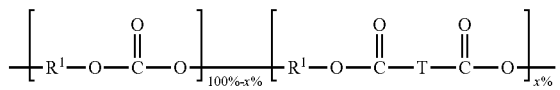

wherein
R$^1$ is a residue of bisphenol A,
T is a C$_{7-11}$ alkylene group, and
x is the mole % of ester units in the copolyestercarbonate based on the total mole % of ester and carbonate units and is 1 to 10, wherein the ester and carbonate units represent at least 90 mole % of the polyestercarbonate;
(c) from 5 to 15 wt. % of mica, talc, or a combination thereof;
(d) from 0.1 to 10 wt. % of a fibrillated polytetrafluoroethylene encapsulated with styrene-acrylonitrile;
(e) from 4 to 20 wt. % of a core-shell polymeric impact modifier;
(f) optionally from 0.05 to 5 wt. % each of an antioxidant, a mold release agent, and a quencher; and
(g) optionally from 1 to 30 wt. % of a bisphenol A polycarbonate.

Also disclosed is a method of manufacture of any of the above-described compositions, comprising melt blending the components of the compositions.

Further disclosed is a method of forming an article comprising injection molding, extrusion, injection blow molding, gas assist blow molding, or vacuum forming the above-described compositions to form the article.

In yet another embodiment, an article comprises one of the above-described compositions.

DETAILED DESCRIPTION OF THE INVENTION

Figure 1:
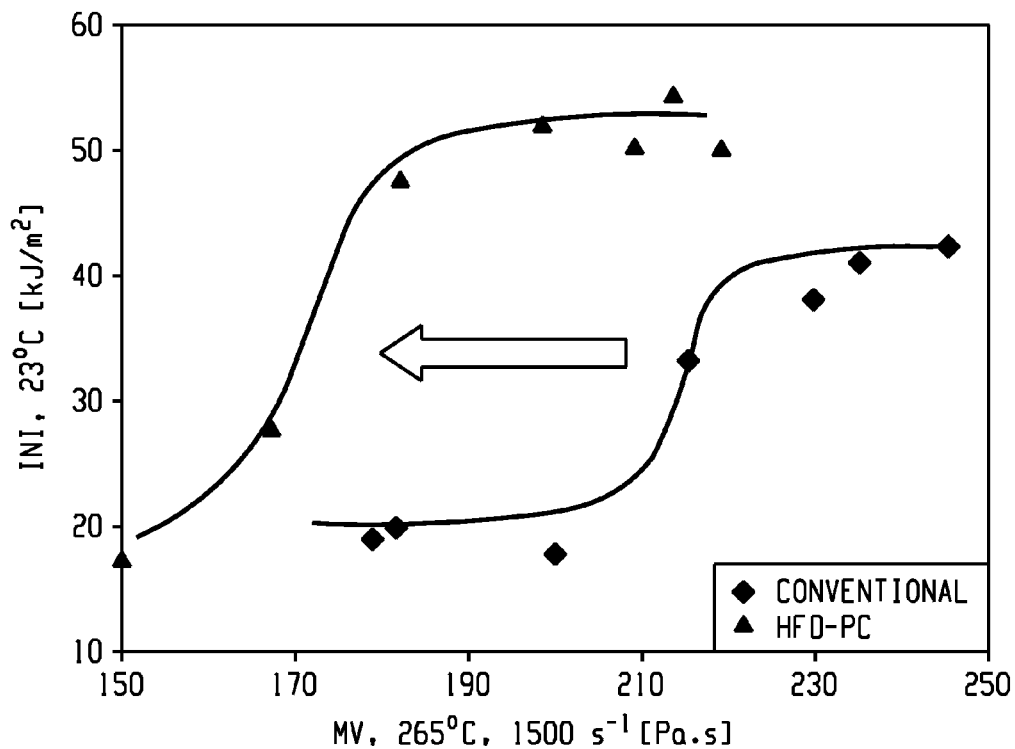
FIG. 1 is a plot of the impact-melt viscosity balance for comparative compositions (♦) and inventive compositions (▲; "HFD-PC") of Example 1 with a tensile modulus of 2700 to 2800 MPa, in which inventive compositions a copolyestercarbonate is blended with polybutylene terephthalate.

The invention is based on the discovery that improved melt flow in certain advantageous polymeric compositions, as herein described, can be achieved while retaining valuable impact and/or modulus properties. Specifically, a carefully balanced combination of both Notched Impact strength and high tensile modulus can be imparted to a composition comprising a polyester and a copolyestercarbonate. An especially advantageous embodiment of this invention involves a polyester component obtained largely from post-consumer recycled polyester polymer. More particularly, the invention is based on the discovery that when an copolyestercarbonate block copolymer is used in combination with a small amount of an impact modifier and a fluoropolymer in a polymer composition comprising a particular thermoplastic polyester, it is possible to obtain an advantageous balance of properties that includes good impact resistance and high modulus even at higher filler loadings.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of at least one of the named components and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated. All cited references are incorporated herein by reference.

For the sake of clarity, the terms "terephthalic acid group," "isophthalic acid group," "butanediol group," and "ethylene glycol group" have the following meanings. The term "terephthalic acid group" in a composition refers to a divalent 1,4-benzene radical (-1,4-(C$_6$H$_4$)—) remaining after removal of the carboxylic groups from terephthalic acid-. The term "isophthalic acid group" refers to a divalent 1,3-benzene radical (–(-1,3-C$_6$H$_4$)—) remaining after removal of the carboxylic groups from isophthalic acid. The "butanediol group" refers to a divalent butylene radical (—(C$_4$H$_8$)—) remaining after removal of hydroxyl groups from butanediol. The term "ethylene glycol group" refers to a divalent ethylene radical (—(C$_2$H$_4$)—) remaining after removal of hydroxyl groups from ethylene glycol. With respect to the terms "terephthalic acid group," "isophthalic acid group," "ethylene glycol group," "butane diol group," and "diethylene glycol group" being used in other contexts, e.g., to indicate the weight percent (wt. %) of the group in a composition, the term "isophthalic acid group(s)" means the group having the formula (—O(CO)C$_6$H$_4$(CO)—), with the ester groups in the 1,3 position), the term "terephthalic acid group" means the group having the formula (—O(CO)C$_6$H$_4$(CO)—), with the ester groups in the 1,4 position), the term diethylene glycol group means the group having the formula (—O(C$_2$H$_4$)O(C$_2$H$_4$)—), the term "butanediol group" means the group having the formula (—O($C_4H_8$)—), and the term "ethylene glycol groups" means the group having formula (—O($C_2H_4$)—).

In an embodiment, a thermoplastic composition comprises, based on the total weight of the composition:
(a) from 10 to 80 wt. % of a polybutylene terephthalate;
(b) from 10 to 80 wt. % of a copolyestercarbonate component, comprising
a first copolyestercarbonate having a number average molecular weight of 15,000 to less than 28,000 Daltons, and
a second copolyestercarbonate having a number average molecular weight of more than 28,000 to 40,000 Daltons,
wherein a weight ratio of the first polyestercarbonate to the second polyestercarbonate is 95:5 to 20:80, and
wherein each copolyestercarbonate comprises structural estercarbonate units of the formula:

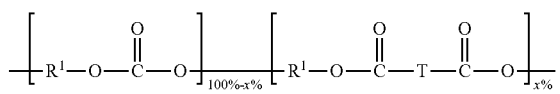

wherein
each R' is independently the same or different $C_{6-30}$ aromatic group,
each T is independently the same or different $C_{2-16}$ alkylene group, and
x is the mole % of ester units in the copolyestercarbonate based on the total mole % of ester and carbonate units and is 1 to 10, wherein the ester and carbonate units represent at least 90 mole % of the polyestercarbonate;
(c) from 3 to 30 wt. % of a particulate filler;
(d) from 0.1 to 10 wt. % of a fluoropolymer;
(e) from 3 to 25 wt. % of a polymeric impact modifier;
(f) from 0 to 5 wt. % of an additive selected from the group consisting of an antioxidant, mold release agent, colorant, quencher, stabilizer, and combination thereof; and
(g) from 0 to 30 wt. % of a polycarbonate;

The thermoplastic composition comprises a polyester, specifically poly(1,4-butylene terephthalate), also referred to as polybutylene terephthalate (PBT). It is to be understood that such terephthalate-based polyesters can include small amounts of isophthalate esters as well.

In order to attain the desired combination of chemical resistance and other desired properties, the PBT polyester has a weight average molecular weight of greater than or equal to 40,000 g/mol, or greater or equal to 70,000, up to 125,000 g/mol, specifically 70,000 to 200,000 g/mol, against polystyrene standards, as measured by gel permeation chromatography in chloroform/hexafluoroisopropanol (5:95, volume/volume ratio) at 25° C. The polyesters can have an intrinsic viscosity (as measured in phenol/tetrachloroethane (60:40, volume/volume ratio) at 25° C.) of 0.5 or 0.8 to 2.0 deciliters per gram.

In addition to PBT polyester, other polyesters can optionally be present in the composition (in an amount of less than 10 wt. % of the composition), provided that such polyesters do not significantly adversely affect the desired properties of the composition.

Other polyesters that can be present are copolyesters derived from an aromatic dicarboxylic acid (specifically terephthalic acid and/or isophthalic acid) and a mixture comprising a linear C2-6 aliphatic diol (specifically ethylene glycol and butylene glycol); and a C6-12 cycloaliphatic diol (specifically 1,4-hexane diol, dimethanol decalin, dimethanol bicyclooctane, 1,4-cyclohexane dimethanol and its cis- and trans-isomers, 1,10-decane diol, and the like) or a linear poly(C2-6 oxyalkylene) diol (specifically, poly(oxyethylene) glycol) and poly(oxytetramethylene) glycol). The ester units comprising the two or more types of diols can be present in the polymer chain as individual units or as blocks of the same type of units. Specific esters of this type include poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) (PTCG) wherein greater than 50 mol % of the ester groups are derived from ethylene (PTCG). Also included are thermoplastic poly(ester-ether) (TPEE) copolymers such as poly(ethylene-co-poly(oxytetramethylene) terephthalate. Also contemplated for use herein are any of the above polyesters with minor amounts, e.g., from 0.5 to 5 wt. %, of units derived from aliphatic acid and/or aliphatic polyols to form copolyesters. The aliphatic polyols include glycols, such as poly(ethylene glycol) or poly(butylene glycol). Such additional polyesters include, for example, poly(1,4-cyclohexylendimethylene terephthalate) (PCT), poly(1,4-cyclohexylenedimethylene cyclohexane-1,4-dicarboxylate) also known as poly(cyclohexane-14-dimethanol cyclohexane-1,4-dicarboxylate) (PCCD), and poly(1,4-cyclohexylenedimethylene terephthalate-co-isophthalate) (PCTA).

The PBT polyester component can comprise a modified poly(butylene terephthalate), that is, a PBT polyester derived from poly(ethylene terephthalate), for example waste PET such as soft drink bottles. The PET-derived PBT (referred to herein for convenience as "modified PBT") (1) can be derived from a poly(ethylene terephthalate) component selected from the group consisting of poly(ethylene terephthalate), poly(ethylene terephthalate) copolymers, and a combination thereof, and (2) has at least one residue derived from the poly(ethylene terephthalate) component. The modified PBT can further be derived from a biomass-derived 1,4-butanediol, e.g., corn derived 1,4-butanediol or a 1,4-butanediol derived from a cellulosic material. Unlike conventional molding compositions containing virgin PBT (PBT that is derived from monomers), the modified PBT contains a poly(ethylene terephthalate) residue, e.g., a material such as ethylene glycol and isophthalic acid groups (components that are not present in virgin, monomer-based PBT). Use of modified PBT can provide a valuable way to effectively use underutilized scrap PET (from post-consumer or post-industrial streams) in PBT thermoplastic molding compositions, thereby conserving non-renewable resources and reducing the formation of greenhouse gases, e.g., $CO_2$.

The residue derived from the poly(ethylene terephthalate) component and which is present in the modified PBT can be selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, alkali salts, alkaline earth metal salts, including calcium, magnesium, sodium and potassium salts, phosphorous-containing compounds and anions, sulfur-containing compounds and anions, naphthalene dicarboxylic acids, 1,3-propanediol groups, and combinations thereof.

Depending on factors such as the type and relative amounts of poly(ethylene terephthalate) and poly(ethylene terephthalate) copolymers, the residue can include various combinations. For example, the residue can include mixtures of ethylene glycol groups and diethylene glycol groups. The residue can also include mixtures of ethylene glycol groups, diethylene glycol groups, and isophthalic acid groups. The residue derived from poly(ethylene terephthalate) can include the cis isomer of 1,3-cyclohexane dimethanol groups, the cis isomer of 1,4-cyclohexane dimethanol groups, the trans isomer of 1,3-cyclohexane dimethanol groups, the trans isomer of 1,4-cyclohexane dimethanol groups, or combinations thereof. The residue can also be a mixture of ethylene glycol groups, diethylene glycol groups, isophthalic acid groups, cis isomer of cyclohexane dimethanol groups, trans isomer of cyclohexane dimethanol groups, or combinations thereof. The residue derived from poly(ethylene terephthalate) can also include mixtures of ethylene glycol groups, diethylene glycol groups, and cobalt-containing compounds. Such cobalt-containing compound mixture can also contain isophthalic acid groups.

The amount of the ethylene glycol groups, diethylene glycol groups, and isophthalic groups in the polymeric backbone of the modified PBT component can vary. The modified PBT ordinarily contains isophthalic acid groups in an amount that is at least 0.1 mole % and can range from 0 or 0.1 to 10 mole % (0 or 0.07 to 7 wt. %). The modified PBT component ordinarily contains ethylene glycol in an amount that is at least 0.1 mole % and can range from 0.1 to 10 mole % (0.02 to 2 wt. %). In an embodiment, the modified PBT component has an ethylene glycol content that is more than 0.85 wt. %. In another embodiment, compositions can contain ethylene glycol in an amount from 0.1 to 2 wt. %. The modified PBT component can also contain diethylene glycol in an amount from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments. Unless otherwise specified, all molar amounts of the isophthalic acid groups and/or terephthalic acid groups are based on the total moles of diacids/diesters in the composition. Unless otherwise specified, all molar amounts of the butanediol, ethylene glycol, and diethylene glycol groups are based on the total moles of diol in the composition. These weight percent measurements are based on the above definitions of terephthalic acid groups, isophthalic acid groups, ethylene glycol groups, and diethylene glycol groups.

The total amount of the poly(ethylene terephthalate) component residue in the modified PBT can vary in amounts from 1.8 to 2.5 wt. %, or from 0.5 to 2 wt. %, or from 1 to 4 wt. %, based on the total weight of the modified PBT. The ethylene glycol, diethylene glycol, and cyclohexane dimethanol groups can be present, individually or in combination, in an amount from 0.1 to 10 mole %, based on 100 mole % of glycol in the molding composition. The isophthalic acid groups can be present in an amount from 0.1 to 10 mole %, based on 100 mole % of diacid/diester in the molding composition.

When it is desirable to make a poly(butylene terephthalate) copolymer having a melting temperature $T_m$ that is at least 200° C., the total amount of diethylene glycol, ethylene glycol, and isophthalic acid groups should be within a certain range. As such, the total amount of the diethylene glycol, ethylene glycol, and isophthalic acid groups in the modified poly(butylene terephthalate) component can be more than 0 and less than or equal to 23 equivalents, relative to the total of 100 equivalents of diol and 100 equivalents of diacid groups in the modified PBT. The total amount of the isophthalic acid groups, ethylene glycol groups, and diethylene glycol groups can be from 3 to less than or equal to 23 equivalents, relative to the total of 100 equivalents of diol and 100 equivalents of diacid groups in the PET-derived PBT. Alternatively, the total amount of the isophthalic acid groups, ethylene glycol groups, and diethylene glycol groups can be from 3 to less than or equal to 10 equivalents, relative to the total of 100 equivalents of diol and 100 equivalents of diacid groups in the modified PBT. Still further, the total amount of the isophthalic acid groups, ethylene glycol groups, and diethylene glycol groups can be from 10 to less than or equal to 23 equivalents, relative to the total of 100 equivalents of diol and 100 equivalents of diacid groups in the modified PBT. The diethylene glycol, ethylene glycol, and/or isophthalic acid can be added during the process.

The total ethylene glycol groups, isophthalic acid groups, and diethylene glycol groups can vary, depending on the application needs. The composition can have total monomer content selected from the group consisting of ethylene glycol, isophthalic acid groups, and diethylene glycol groups in an amount from more than 0 and less than or equal to 17 equivalents relative to the total of 100 equivalents of diol and 100 equivalents of diacid groups in the modified PBT. Advantageously, such compositions can maintain useful properties, such as heat deflection temperatures that are more than 80° C.

It has also been discovered that the total amount of inorganic residues derived from the poly(ethylene terephthalate) can be present from more than 0 ppm and up to 1000 ppm. Examples of such inorganic residues include those selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. The amounts of inorganic residues can be from 250 to 1000 ppm, and more specifically from 500 to 1000 ppm.

The PET component from which the modified PBT is made can have a variety of forms. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid, and other contaminants. Also, the PET component can include PET that is not waste in flake, chip, or pellet form. As such, PET that would ordinarily be deposited in landfills can now be used productively and effectively. The PET component can also include other polyesters and/or polyester copolymers. Examples of such materials include poly(alkylene terephthalates) selected from the group consisting of poly(ethylene terephthalate), poly(cyclohexane dimethanol terephthalate), copolyesters of terephthalate esters with comonomers containing cyclohexanedimethanol and ethylene glycol, copolyesters of terephthalic acid with comonomers containing cyclohexane dimethanol and ethylene glycol, poly(butylene terephthalate), poly(xylylene terephthalate), poly(butylene terephthalate), poly(trimethylene terephthalate), poly(ester naphthalate), and combinations thereof.

Commercial examples of a modified PBT include those available under the trade name VALOX iQ PBT, manufactured by SABIC Innovative Plastics Company. The modified PBT can be derived from the poly(ethylene terephthalate) component by any method that involves depolymerization of the poly(ethylene terephthalate) component and polymerization of the depolymerized poly(ethylene terephthalate) component with 1,4-butanediol to provide the modified PBT. For example, the modified poly(butylene terephthalate) component can be made by a process that involves depolymerizing a poly(ethylene terephthalate) component selected from the group consisting of poly(ethylene terephthalate) and poly(ethylene terephthalate) copolymers, with a 1,4-butanediol component at a temperature from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof; and agitating the molten mixture at sub-atmospheric pressure and increasing the temperature of the molten mixture to an elevated temperature under conditions sufficient to form a modified PBT containing at least one residue derived from the poly(ethylene terephthalate) component.

The present composition can comprise a PBT polyester content of more than 10 to 80 wt. %, specifically 15 to 50 wt. %, more specifically 20 to 45 wt. %, most specifically 25 to 40 wt. %, based on the total weight of the composition.

The thermoplastic composition further includes a first and second copolyestercarbonate and can optionally also include a polycarbonate, specifically a bisphenol A polycarbonate.

A copolyestercarbonate is a specific type of polycarbonate, a copolymer comprising polyester and carbonate blocks.

Generally, as used herein, the terms "polycarbonate" and "polycarbonate resin" mean compositions having repeating structural carbonate units of the formula (1):

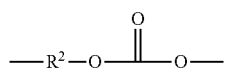

(1)

in which at least 60 percent of the total number of $R^2$ groups are aromatic organic radicals and the balance thereof are aliphatic, alicyclic, or aromatic radicals. In one embodiment, each $R^2$ is an aromatic organic radical, for example a radical of the formula (2):

-$A^1$-$Y^1$-$A^2$- (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene, or isopropylidene.

Polycarbonates can be produced by the reaction of dihydroxy compounds having the formula HO—$R^2$—OH, which includes dihydroxy compounds of formula (3):

HO-$A^1$-$Y^1$-$A^2$-OH (3)

wherein $Y^1$, $A^1$ and $A^2$ are as described above. Also included are bisphenol compounds of general formula (4):

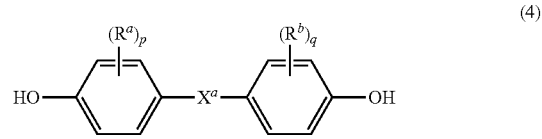

(4)

wherein $R^a$ and $R^b$ each represent a halogen atom or a monovalent hydrocarbon group and can be the same or different; p and q are each independently integers of 0 to 4; and $X^a$ represents one of the groups of formula (5):

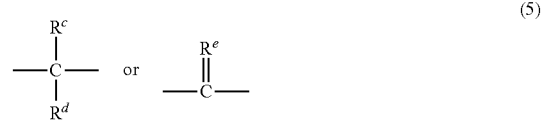

(5)

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group can have 3 to 20 atoms, and can be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

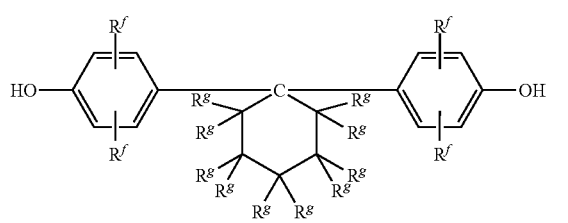

(6)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—R²—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis (4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

In a specific embodiment, where a polycarbonate is included, the polycarbonate can be a linear homopolymer derived from bisphenol A, in which each of $A^1$ and $A^2$ is p-phenylene and $Y^1$ is isopropylidene. The polycarbonates generally can have an intrinsic viscosity, as determined in chloroform at 25° C., of 0.3 to 1.5 deciliters per gram (dl/g), specifically 0.45 to 1.0 dl/g. The polycarbonates can have a weight average molecular weight (Mw) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate can have a melt volume flow rate (often abbreviated MVR) measures the rate of extrusion of a thermoplastics through an orifice at a prescribed temperature and load. Polycarbonates useful for the formation of articles can have an MVR, measured at 300° C. under a load of 1.2 kg according to ASTM D1238-04 or ISO 1133, of 0.5 to 80 cubic centimeters per 10 minutes (cc/10 min) In a specific embodiment, where a polycarbonate is used in addition to the polyestercarbonate, the polycarbonate (or a combination of polycarbonates, i.e., a polycarbonate composition) can have an MVR measured at 300° C. under a load of 1.2 kg according to ASTM D1238-04 or ISO 1133, of 5 to 35 cc/10 min, specifically 10 to 35 cc/10 min, and more specifically 25 to 35 cc/10 min "Polycarbonates" and "polycarbonate resins" as used herein further include homopolycarbonates, copolymers comprising different $R^2$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. In one embodiment of the invention, however, the polycarbonate component in the composition consists essentially of, or consists of, a copolyestercarbonate and an optional polycarbonate that is bisphenol A polycarbonate. In such embodiments other polycarbonates besides the copolyestercarbonate and an optional polycarbonate that is bisphenol A polycarbonate, are excluded or essentially excluded, including the exclusion of polysiloxane-polycarbonate copolymers. By essentially excluded is meant less than about 5 wt. % of the total composition, specifically less than 2 wt. % of the total composition.

As indicated above, a copolyestercarbonate is a specific type of polycarbonate polymer, a copolymer also referred to as a polyester-polycarbonate. In the present composition, such copolymers contain recurring carbonate chain units of the formula (1), in which $R^2$ is limited to a $C_{6-30}$ aromatic group ($R^1$ in the copolyestercarbonate formula) and, in addition, units of formula (8):

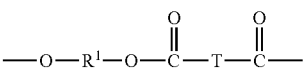

(8)

wherein $R^1$ is a divalent group, specifically a $C_{6-30}$ aromatic group as defined by $R^1$; and T is a divalent group that can be derived from a dicarboxylic acid, and is a $C_{2-16}$ alkylene group, specifically a $C_{4-14}$ alkylene group, more specifically a $C_{7-11}$ alkylene group.

$R^1$ can be derived from an aromatic dihydroxy compound of formula (4) above, or from an aromatic dihydroxy compound of formula (7) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The mole percent of ester units in the first and second copolyestercarbonates copolymers can independently vary somewhat, for example 5 to 10 mole percent, specifically 6 to 9 mole percent, more specifically 6.5 to 8.5 mole percent, depending on the desired properties of a particular composition or its application.

The first and second polyestercarbonate copolymers independently have the ester units of formula (8) and, therefore, comprise soft block ester units, also are referred to herein as aliphatic dicarboxylic acid ester units. Such polyestercarbonate copolymers can also be referred to as a poly(aliphatic ester)-polycarbonate. The soft block ester unit consisting of a $C_{4-18}$ aliphatic dicarboxylic acid ester unit (where $C_{4-18}$ includes the terminal carboxyl groups), can be straight chain (i.e., unbranched) or branched chain dicarboxylic acids, cycloalkyl or cycloalkylidene-containing dicarboxylic acids units, or combinations of these structural units. In an embodiment, the $C_{4-18}$ aliphatic dicarboxylic acid ester unit includes a straight chain alkylene group comprising methylene ($—CH_2—$) repeating units. In a specific embodiment, a useful soft block ester unit comprises units of formula (8a):

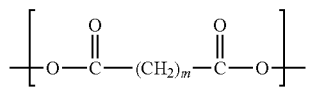

(8a)

where m is 2 to 16, specifically 8 to 12. In a specific embodiment of formula (8a), m is independently 7 to 11 for both the first and second copolyestercarbonates. In one embodiment, the soft block esters have a glass transition temperature of 128 to 139° C., specifically 130 to 139° C.

Thus, the first and second copolyestercarbonates are each independently a copolymer of soft block ester units with carbonate units that can independently be represented by the formula (8b):

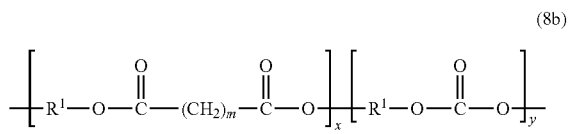

(8b)

where each $R^1$ is independently derived from a dihydroxyaromatic compound of formula (4) or (7), m is 2 to 16, and x and y each represent average mole percents in the copolyestercarbonate, where x+y is 100 and, therefore, y is 100%-x %, wherein x % is the mole percent of the ester units as specified above for the copolyestercarbonate.

Soft block ester units, as defined herein, can be derived from an alpha, omega $C_{6-20}$ aliphatic dicarboxylic acid or a reactive derivative thereof. In a specific embodiment, the carboxylate portion of the aliphatic ester unit of formula (8a), in which the terminal carboxylate groups are connected by a chain of repeating methylene ($—CH_2—$) units (where m is as defined for formula (8a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides can be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{4-18}$ limitation can be used. A specific embodiment of the first and second poly(aliphatic ester)-polycarbonate each having soft block ester units comprising a straight chain methylene group and a bisphenol A polycarbonate group can independently be represented by formula (8c):

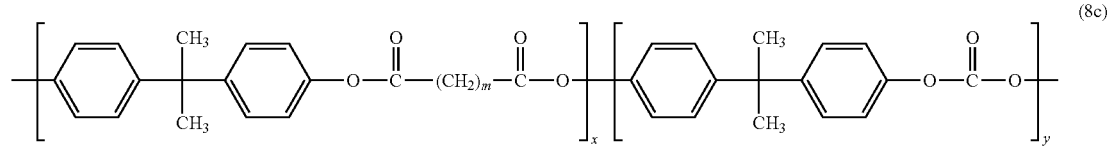

(8c)

where m is 2 to 16 and x and y are as defined for formula (8b). In a specific exemplary embodiment, a useful copolyestercarbonate copolymer comprises sebacic acid ester units and bisphenol A carbonate units (formula (8c). In one such embodiment, m is 8, and the average mole ratio of x:y is about 6:94.

Polycarbonates, either as optional polycarbonates or as polycarbonate blocks for copolyestercarbonates, can be manufactured by processes such as interfacial polymerization or melt polymerization. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be about 0.1 to about 10 wt. % based on the weight of bisphenol in the phosgenation mixture. In another embodiment an effective amount of phase transfer catalyst can be about 0.5 to about 2 wt. % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing. In addition, transesterification catalysts for use can include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The first and second copolyestercarbonates can also be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly(arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative can be condensed with the dihydroxyaromatic compound in a first condensation, followed by in situ phosgenation to generate the carbonate linkages with the dihydroxyaromatic compound. Alternatively, the dicarboxylic acid or derivative can be condensed with the dihydroxyaromatic compound simultaneously with phosgenation.

The polyesters, either the PBT polymer or the polyester blocks for the first or second copolyestercarbonate, can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

The first and second copolyestercarbonate copolymers are distinguishable in that the first copolyestercarbonate has a number average molecular weight of 15,000 to less than 28,000 Daltons, and the second copolyestercarbonate has a number average molecular weight of more than 28,000 to 40,000 Daltons, wherein a weight ratio of the first polyestercarbonate to the second polyestercarbonate is 95:5 to 20:80, specifically 75:25 to 25:75, more specifically 70:30 to 60:40. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min A copolyestercarbonate in general can in general have an MVR of about 5 to about 150 cc/10 min., specifically about 7 to about 125 cc/10 min., more specifically about 9 to about 110 cc/10 min., and still more specifically about 10 to about 100 cc/10 min., measured at 300° C. and a load of 1.2 kilograms according to ASTM D1238-04. Commercial copolyestercarbonates are marketed under the trade name Lexan® HFD, including for example, and are available from SABIC Innovative Plastics.

Exemplary thermoplastic compositions include blends of PBT polyester and poly(sebacic acid ester)-co-(bisphenol A carbonate). It will be understood that a wide variety of thermoplastic compositions and articles derived from them can be obtained by not only changing the thermoplastic compositions (e.g., by replacing sebacic acid with adipic acid in the poly(sebacic acid ester)-co-(bisphenol A carbonate), but also by changing the amount of each polymer in the composition, within specified limits. Similarly, new thermoplastic compositions can be identified by changing the molecular weights, within specified limits, of the components in the exemplary copolymer blends while keeping, for example, sebacic acid and/or amounts of each polymer constant.

The thermoplastic composition further comprises a fluoropolymer, specifically a fluorinated polyolefin, as an antidripping agent, which reduces the tendency of the material to produce burning drips in case of flame. Fluorinated polyolefins are known and are described, for example, in EP-A 0 640 655. They are marketed, for example, by DuPont under the trademark Teflon® 30N. Fluoropolymers suitable for use as the fluoropolymer component can be fibrillated ("fibrillatable"). "Fibrillation" is a term of art that refers to the treatment of fluoropolymers so as to produce, for example, a "node and fibril," network, or cage-like structure. Suitable fluoropolymers include but are not limited to homopolymers and copolymers that comprise structural units derived from one or more fluorinated alpha-olefin monomers, that is, an alpha-olefin monomer that includes at least one fluorine atom in place of a hydrogen atom. In one embodiment the fluoropolymer comprises structural units derived from two or more fluorinated alpha-olefin, for example tetrafluoroethylene, hexafluoroethylene, and the like. In an embodiment, the fluoropolymer comprises structural units derived from one or more fluorinated alpha-olefin monomers and one or more non-fluorinated monoethylenically unsaturated monomers that are copolymerizable with the fluorinated monomers, for example alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include poly(tetrafluoroethylene), poly(hexafluoropropylene), poly(vinylidene fluoride), poly(chlorotrifluoroethylene), poly(ethylene-tetrafluoroethylene), fluorinated ethylene-propylene polymer, poly(vinyl fluoride), and poly(ethylene-chlorotrifluoroethylene). Combinations comprising at least one of the foregoing fluoropolymers can also be used.

In an embodiment, the fluoropolymer is at least partially encapsulated by an encapsulating polymer that can be the same or different as the matrix polymer (hereinafter referred to as an "encapsulated polymer"). Without being bound by theory, it is believed that encapsulation can aid in the distribution of the fluoropolymer within the matrix, and/or compatibilize the fluoropolymer with the matrix. Specific encapsulating polymers include polystyrene, copolymers of polystyrene, poly(alpha-methylstyrene), poly(alpha-ethylstyrene), poly(alpha-propylstyrene), poly(alpha-butylstyrene), poly(p-methylstyrene), polyacrylonitrile, poly(methacrylonitrile), poly(methyl acrylate), poly(ethyl acrylate), poly(propyl acrylate), and poly(butyl acrylate), poly(methyl methacrylate), poly(ethyl methacrylate), poly(propyl methacrylate), poly(butyl methacrylate); polybutadiene, copolymers of polybutadiene with propylene, poly(vinyl acetate), poly(vinyl chloride), poly(vinylidene chloride), poly(vinylidene fluoride), poly(vinyl alcohols), acrylonitrile-butadiene copolymer rubber, acrylonitrile-butadiene-styrene (ABS), poly(C4-8 alkyl acrylate) rubbers, styrene-butadiene rubbers (SBR), EPDM rubbers, silicon rubber and combinations comprising at least one of the foregoing encapsulating polymers. In another embodiment, the encapsulating polymer comprises SAN, ABS copolymers, alpha-(C1-3)alkyl-styrene-acrylonitrile copolymers, alpha-methylstyrene-acrylonitrile (AMSAN) copolymers, SBR, and combinations comprising at least one of the foregoing. In yet another embodiment the encapsulating polymer is SAN or AMSAN.

In a specific embodiment the encapsulated fluoropolymer is poly(tetrafluoroethylene) (PTFE) encapsulated by a styrene-acrylonitrile copolymer (SAN). Small amounts of other fluoropolymers can be used, for example those comprising units derived from fluorinated monomers such as 3,3,3-trifluoropropene, 3,3,3,4,4-pentafluoro-1-butene, hexafluoropropylene, vinyl fluoride; vinylidene fluoride, 1,2-difluoroethylene, and the like, or a mixture comprising at least one of the foregoing monomers. Suitable amounts amount of encapsulating polymer can be determined by one of ordinary skill in the art without undue experimentation, using the guidance provided below. In one embodiment, the encapsulated fluoropolymer comprises about 10 to about 90 wt. % (wt. %) fluoropolymer and about 90 to about 10 wt. % of the encapsulating polymer, based on the total weight of the encapsulated fluoropolymer. Alternatively, the encapsulated fluoropolymer comprises about 20 to about 80 wt. %, more specifically about 40 to about 60 wt. % fluoropolymer, and about 80 to about 20 wt. %, specifically about 60 about 40 wt. % encapsulating polymer, based on the total weight of the encapsulated polymer.

A useful encapsulated fluoropolymer is PTFE encapsulated in styrene-acrylonitrile (SAN), also known as TSAN. The SAN can comprise, for example, about 75 wt. % styrene and about 25 wt. % acrylonitrile based on the total weight of the copolymer. An exemplary TSAN comprises about 50 wt. % PTFE and about 50 wt. % SAN, based on the total weight of the encapsulated fluoropolymer.

The present compositions can comprise from 0.02 to 15 wt. % of the fluorinated polyolefin, or from 0.04 to 10 wt. %, specifically from 0.1 to 4 wt. %, more specifically from 0.5 to 1.5 wt. %, based on the total weight of the composition.

The thermoplastic composition further comprises an impact modifier in an amount from 3 to 25 wt. %, based on the total weight of the composition. In other embodiments, such impact modifiers are present in an amount from 5 to 20 wt. %, specifically from 6 to 15 wt. %, based on the total weight of the composition.

Such impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of such impact modifiers can be used.

An example of specific type of impact modifier is an elastomer-modified graft copolymer comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Other impact modifiers include an epoxy-functional copolymer comprising units derived from a C2-20 olefin and units derived from a glycidyl (meth)acrylate. Exemplary olefins include ethylene, propylene, butylene, and the like. The olefin units can be present in the copolymer in the form of blocks, e.g., as polyethylene, polypropylene, polybutylene, and the like blocks. It is also possible to use mixtures of olefins, i.e., blocks containing a mixture of ethylene and propylene units, or blocks of polyethylene together with blocks of polypropylene.

In addition to glycidyl (meth)acrylate units, the copolymers can further comprise additional units, for example C1-4 alkyl (meth)acrylate units. In one embodiment, the impact modifier is terpolymeric, comprising polyethylene blocks, methyl acrylate blocks, and glycidyl methacrylate blocks. Specific impact modifiers are a co- or ter-polymer including units of ethylene, glycidyl methacrylate (GMA), and methyl acrylate, available under the trade name Lotader® polymer, sold by Arkema. The terpolymers comprise, based on the total weight of the copolymer, 0.3 to 12 wt. % of glycidyl methacrylate units, more specifically 0.4 to 11 wt. % of glycidyl methacrylate units, even more specifically 0.5 to 10 wt. % of glycidyl methacrylate units. Suitable impact modifiers include the ethylene-methyl acrylate-glycidyl methacrylate terpolymer comprising 8 wt. % glycidyl methacrylate units available under the trade name LOTADER AX8900.

Specifically, such impact modifiers include methyl meth (acrylate)-butadiene-styrene, acrylonitrile-butadiene-styrene, styrene-ethylene/butylene-styrene, ethylene-glycidyl methacrylate-methyl acrylate, ethylene-glycidyl (meth)acrylate-methyl acrylate impact modifier, and combinations thereof.

Other polymers that can be included in the composition, in relatively minor amounts, include polyamides, polyolefins, poly(arylene ether)s, poly(arylene sulfide)s, polyetherimides, polyvinyl chlorides, polyvinyl chloride copolymers, silicones, silicone copolymers, C1-6 alkyl (meth)acrylate polymers (such as poly(methyl methacrylate)), and C1-6 alkyl (meth)acrylate copolymers. Such polymers are generally present in amounts of 0 to 10 wt. % of the total thermoplastic composition.

The compositions can include various additives ordinarily incorporated into polymer compositions of this type, with the proviso that the additives are selected so as to not significantly adversely affect the desired properties of the thermoplastic composition. Exemplary additives include fillers, catalysts (for example, to facilitate reaction between an impact modifier and the polyester), antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, anti-drip agents, and radiation stabilizers. Combinations of additives can be used. The foregoing additives (except any fillers) are generally present in an amount from 0.005 to 20 wt. %, specifically 0.01 to 10 wt. %, based on the total weight of the composition.

Particulate fillers can include, for example, alumina, amorphous silica, anhydrous alumino silicates, mica, wollastonite, barium sulfate, zinc sulfide, clays, talc, and metal oxides such as titanium dioxide, carbon nanotubes, vapor grown carbon nanofibers, tungsten metal, barites, calcium carbonate, milled glass, flaked glass, ground quartz, silica, zeolites, and solid or hollow glass beads or spheres, and fibrillated tetrafluoroethylene. Reinforcing fillers can also be present. Suitable reinforcing fillers include fibers comprising glass, ceramic, or carbon, specifically glass that is relatively soda free, more specifically fibrous glass filaments comprising lime-alumino-borosilicate glass, which are also known as "E" glass. The fibers can have diameters of 6 to 30 micrometers. The fillers can be treated with a variety of coupling agents to improve adhesion to the polymer matrix, for example with amino-, epoxy-, amido- or mercapto-functionalized silanes, as well as with organometallic coupling agents, for example, titanium or zirconium based compounds. Particulate fillers, if present, are used in amounts effective to provide the desired effect (e.g., titanium dioxide in an amount effective to provide ultraviolet light resistance), for example, 0.1 to 20 wt. % of the total thermoplastic composition. Fibrous fillers, if present, are used in amounts effective to provide the desired effect (e.g., strength), without significantly adversely affecting other desired properties of the composition. In one embodiment, fillers are present in an amount of 0 to 10 wt. % of the total thermoplastic composition, specifically less than 5 wt. %, based on weight of the total thermoplastic composition.

To prepare the thermoplastic composition, the components can be mixed by any known methods. Typically, there are two distinct mixing steps: a premixing step and a melt mixing ("melt blending") step. In the premixing step, the dry ingredients are mixed together. The premixing is typically performed using a tumbler mixer or ribbon blender. However, if desired, the premix can be manufactured using a high shear mixer such as a Henschel mixer or similar high intensity device. The premixing is typically followed by melt mixing in which the premix is melted and mixed again as a melt. Alternatively, the premixing can be omitted, and raw materials can be added directly into the feed section of a melt mixing device, preferably via multiple feeding systems. In melt mixing, the ingredients are typically melt kneaded in a single screw or twin screw extruder, a Banbury mixer, a two roll mill, or similar device. The examples are extruded using a twin screw type extruder, where the mean residence time of the material is from about 20 seconds to about 30 seconds, and where the temperature of the different extruder zones is from about 230° C. to about 290° C.

In a specific embodiment, the thermoplastic compositions are prepared by blending the components of the composition by placing into an extrusion compounder to produce molding pellets. The components are dispersed in a matrix in the process. In another procedure, the components and reinforcing filler are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The components can be pre-compounded, pelletized, and then molded. Pre-compounding can be carried out in conventional equipment. For example, after pre-drying the composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions, such as a Newbury or van Dorn type injection molding machine with conventional cylinder temperatures, at 230° C. to 280° C., and conventional mold temperatures at 55° C. to 95° C.

The inventors have found that a useful balance of properties can be obtained using a blend of polymers, including a PBT polyester, a first and second copolyestercarbonate, and other specified components. For example, in one embodiment, the composition, comprising from 3 to 20 wt. % of the particulate filler, from 5 to 25 wt. % of the second copolyestercarbonate copolymer, and from 20 to 40 wt. % of the first copolyestercarbonate, can have (i) a melt viscosity less than 250 Pa·s, as determined in accordance with ISO 11443 at 265° C. at a shear rate of $1500\ s^{-1}$ and (ii) at least 80% retention of its notched Izod impact strength, as determined in accordance with ISO 180 at 23° C., as compared to the same composition in which the first and second copolyestercarbonates are replaced by bisphenol A polycarbonates of the same number average molecular weights.

Advantageously, the composition, wherein the composition has a filler content ranging from 3 to 10 weight %, can be characterized by, the following: (i) a notched Izod impact strength of greater than 25 $KJ/m^2$, as measured on a 4 mm thick bar molded from the composition, according to ISO 180 at 23° C. and (ii) a melt viscosity that is 210 Pa·s or less, as determined in accordance with ISO 11443 at 265° C. at a shear rate of $1500\ s^{-1}$ and (iii) a drop in tensile modulus that is less than 150 MPa, as determined in accordance with ISO 527, as measured on an article molded from the composition, compared to the same composition in which the first and second copolyestercarbonates are replaced by bisphenol A polycarbonates of the same average number molecular weights.

Advantageously, the composition, wherein the composition has a filler content ranging from 10 to 20 weight %, can be characterized by, the following: (i) a notched Izod impact strength of greater than 13 $KJ/m^2$, as measured on a 4 mm thick bar molded from the composition, according to ISO 180 at 23° C. and (ii) a melt viscosity that is 230 Pa·s or less, as determined in accordance with ISO 11443 at 265° C. at a shear rate of $1500\ s^{-1}$ and (iii) a drop in tensile modulus that is less than 150 MPa, as determined in accordance with ISO 527, as measured on an article molded from the composition, compared to the same composition in which the first and second copolyestercarbonates are replaced by bisphenol A polycarbonates of the same average number molecular weights.

In particular, a thermoplastic composition comprises, based on the total weight of the composition:
(a) from 20 to 70 wt. % of a polybutylene terephthalate;
(b) from 20 to 70 wt. % of a copolyestercarbonate component, comprising
    a first copolyestercarbonate having a number average molecular weight of 18,000 to less than 25,000 Daltons, and
    a second copolyestercarbonate having a number average molecular weight of more than 32,000 to 38,000 Daltons,
wherein a weight ratio of the first polyestercarbonate:second polyestercarbonate is 95:5 to 20:80 and wherein each copolyestercarbonate comprises structural estercarbonate units of the formula

wherein
R$^1$ is a residue of bisphenol A,
T is a C$_{7-11}$ alkylene group, and
x is the mole % of ester units in the copolyestercarbonate based on the total mole % of ester and carbonate units and is 1 to 10, wherein the ester and carbonate units represent at least 90 mole % of the polyestercarbonate;
(c) from 5 to 15 wt. % of mica, talc, or a combination thereof;
(d) from 0.1 to 10 wt. % of a fibrillated polytetrafluoroethylene encapsulated with styrene-acrylonitrile;
(e) from 4 to 20 wt. % of a core-shell polymeric impact modifier;
(f) optionally, from 0.05 to 5 wt. % each of an antioxidant, a mold release agent, and a quencher; and
(g) optionally, from 1 to 30 wt. % of a bisphenol A polycarbonate.

The compositions can be shaped into an article by various techniques known in the art such as injection molding, extrusion, injection blow molding, gas assist molding. The compositions are thus useful in the manufacture of non-electrical, electrical, or electronic parts. Articles can include the exterior or interior components of aircraft, automotive, truck, motorcycle, or other vehicles, including panels, quarter panels, rocker panels, trim fenders, deck lids, trunk lids, hoods, bumpers, fascia, grilles, mirror housings, cladding, wheel covers, hubcaps, door components, spoilers, tank flaps, rocker panels, side panels, window frames, head or tail lamps, roof racks, and running boards. Articles can also include enclosures for a wide variety of electrical and telecommunication devices, for example, housing for electronic components, including power tools, home appliances, or computer components, computer accessories such as printers, copiers, or keyboards, and telecommunication devices, for example, mobile phones, radios, or fax machines. Still further applications can include, but are not limited to, boats and marine equipment, pools, building and construction applications, display items, signs, and like applications.

The invention also provides a polymer composition that can use a post-consumer recycled polyester polymer as its polyester component, such that the composition can at least substantially maintain important properties such as chemical resistance and impact resistance, as well as other physical properties.

This invention is further illustrated by the following Examples, which are not intended to limit the claims.

EXAMPLES

Materials

The following materials used for the examples and comparative Examples are shown in Table 1. In the Tables below, compositions are given by weight based on the total weight of the composition.

TABLE 1

Materials

| Component | Chemical Description [CAS Ref. No.] | Source |
| --- | --- | --- |
| PC105 | Bisphenol A polycarbonate resin, interfacial polymerization, Mw about 30,000 g/mol [CAS: 25971-63-5] | Sabic Innovative Plastics |
| PC175 | Bisphenol A polycarbonate resin, interfacial polymerization, Mw about 22,000 g/mol [CAS: 25971-63-5] | Sabic Innovative Plastics |
| PBT315 | Polybutylene terephthalate, IV 1.19 [CAS: 30965-26-5] | BASF |
| PBT195 | Polybutylene terephthalate, IV 0.66 [CAS: 30965-26-5] | BASF |
| JETFINE 3CA | Talc (Magnesium silicate hydrate; Mg$_3$((OH)$_2$Si$_4$O$_{10}$)), particle size, d$_{50}$: 1.1 micrometer [CAS: 14807-96-6] | Luzenac |
| PARALOID EXL-2650A | MBS core-shell impact modifier, methyl methacrylate-butadiene-styrene copolymer [CAS: 25053-09-2] | Rohm & Haas |
| TSAN | PTFE-SAN, PTFE/E-SAN 50/50 [CAS: 9002-84-0] | Sabic Innovative Plastics |
| PC-EXL | Polycarbonate-polydimethylsiloxane copolymer, 20 wt % siloxane, MW about 30,000 g/mol [CAS: 202483-49-6] | Sabic Innovative Plastics |
| PC-HFD HIGH | Sebacic acid/BPA/PCP polyestercarbonate, 8.3 mol % sebacic acid, Mw about 35,400 g/mol [CAS: 137397-37-6] | Sabic Innovative Plastics |
| PC-HFD LOW | Sebacic acid/BPA/PCP polyestercarbonate, 6 mol % sebacic acid, Mw about 21,500 g/mol [CAS: 137397-37-6] | Sabic Innovative Plastics |
| H$_3$PO$_3$, 45% in H$_2$O | Phosphorous acid (H$_3$PO$_3$) (aqueous solution, 45 wt %) [CAS: 10294-56-1] | Quaron |
| AO1010 | Pentaerythritol-tetrakis(3-(3,5-di-tert-butyl-4-hydroxy-phenyl-)propionate) [CAS: 6683-19-8] | Great Lakes |
| PBT R350 | Polybutylene terephthalate oligomer, IV 0.228 [CAS: 30965-26-5] | Sabic Innovative Plastics |
| PETS | Pentaerythritol tetrastearate, >90% esterified [CAS: 115-83-3] | FACI |
| PELTP | Pentaerythritol tetrakis(3-laurylthiopropionate) [CAS: 29598-76-3] | Crompton |

Procedures

The components of the examples and comparative examples were extruded on a 25 mm Werner Pfleiderer Twin Screw Extruder with a vacuum vented mixing screw, at a barrel and die head temperature between 240 and 275° C. and 150 to 300 revolutions per minute (rpm) screw speed. The extruder had three independent feeders for different raw materials. The extrudate was cooled through a water bath prior to pelletizing. Test parts were injection molded on an Engel 110T-molding machine with a set temperature of approximately 240 to 265° C. The pellets were dried for 2 hours at 110° C. in a forced air-circulating oven prior to injection molding.

Testing Procedures

The following testing procedures were used.

Capillary viscosity, which is an indicator of melt flow, was measured by ISO 11443. Dried pellets were extruded through a Capillary Rheometer, and the force at varied shear rates was determined to estimate the shear viscosity. The reported melt viscosities are measured at a shear rate of 1500 s$^{-1}$.

Tensile properties were tested according to ISO 527 on 150×10×4 mm (length×width×thickness) injection molded bars at 23° C. with a crosshead speed of 50 mm/min.

Izod notched impact was measured at 23° C. with a pendulum of 5.5 Joule on 80×10×4 mm (length×width×thickness) impact bars according to ISO 180/1A.

Multiaxial impact (puncture impact) was measured according to ISO 6603 at temperatures of 23° C. and −20° C. with an impact velocity of 4.4 m/s on discs with 3.2 mm thickness and diameter of 10 mm.

A synopsis of all the relevant tests and test methods is given in Table 2.

TABLE 2

Test Methods and Descriptions

| Test | Standard | Default Specimen Type | Units |
|---|---|---|---|
| ISO Tensile Modulus Test | ISO 527 | Multi-purpose ISO 527 | MPa |
| ISO Izod at Room Temperature | ISO 180/1A | Multi-purpose ISO 3167 Type A | kJ/m$^2$ |
| ISO Multiaxial impact | ISO 6603 | Disc - 10 × 3.2 mm | J |
| ISO Melt Viscosity | ISO 11443 | Pellets | Pa·s |

Examples 1 and 2 and Comparative Examples 3-6

The purpose of Examples 1 and 2 is to demonstrate the unique performance of a combination of low and high molecular weight PC-HFD resin in mineral filled and impact modified polycarbonate-polybutylene terephthalate combinations with respect to the flow characteristics and impact properties at a target tensile modulus of 2700-2800 MPa. Examples 1 and 2 are examples of the invention, whereas Comparative Examples 3-8 show comparative compositions that do not yield the unique property profile of the claimed composition.

Table 3 summarizes the compositions and the results of Examples 1-2 and Comparative Examples 3-8.

TABLE 3

Formulations of Examples 1-2 and Comparative Examples 3-8

| Component | EX. 1 | EX. 2 | C. EX. 3 | C. EX. 4 | C. EX. 5 | C. EX. 6 | C. EX. 7 | C. EX. 8 |
|---|---|---|---|---|---|---|---|---|
| PBT195 | 35.38 | 35.38 | 8.80 | 35.38 | 34.76 | 33.18 | 35.38 | 35.38 |
| PBT 315 | | | 29.87 | | | | | |
| PC175 | | | | 22.51 | 44.24 | 21.11 | | 22.51 |
| PC105 | | | 49.22 | 22.51 | | 21.11 | | |
| PC-HFD HIGH | 22.51 | 15.01 | | | | | | 22.51 |
| PC-HFD LOW | 22.51 | 30.02 | | | | | 45.02 | |
| PBT R350 | | | | | | 5.00 | | |
| JETFINE | 5.50 | 5.50 | 3.00 | 5.50 | 6.00 | 5.50 | 5.50 | 5.50 |
| TSAN | 1.50 | 1.50 | 1.50 | 1.50 | 1.50 | 1.50 | 1.50 | 1.50 |
| AO1010 | 0.10 | 0.10 | 0.08 | 0.10 | 0.10 | 0.1 | 0.10 | 0.10 |
| PELTP | 0.05 | 0.05 | 0.05 | 0.05 | 0.05 | 0.05 | 0.05 | 0.05 |
| PETS | 0.30 | 0.30 | 0.30 | 0.30 | 0.30 | 0.30 | 0.30 | 0.30 |
| H$_3$PO$_3$ | 0.15 | 0.15 | 0.18 | 0.15 | 0.15 | 0.15 | 0.15 | 0.15 |
| Carbon Black | | | | | 0.90 | | | |
| MBS | 12.00 | 12.00 | 7.00 | 12.00 | 12.00 | 12.00 | 12.00 | 12.00 |
| Melt viscosity | 190 | 180 | 330 | 230 | 195 | 180 | 150 | 215 |
| Tensile modulus | 2730 | 2700 | 2750 | 2800 | 2880 | 2840 | 2750 | 2740 |
| INI AT 23° C. | 54 | 47 | 50 | 46 | 18 | 18 | 17 | 54 |
| MAI AT 23° C. | 120 | 100 | 110 | 90 | | | 120 | 120 |
| MAI AT −20° C. | 100 | 100 | 100 | 80 | 70 | 50 | 80 | 100 |
| Strain to break | 100 | 110 | 120 | 70 | 15 | 20 | 15 | 120 |

The results in Table 3 show evidence that the use of a combination of high and low molecular weight PC-HFD copolymer instead of bisphenol A polycarbonate of comparable molecular weights results in compositions with an improved balance of melt viscosity that is 210 Pa·s (at 265° C. and 1500 s$^{-1}$) or lower and an article molded from the composition retains at least 80% of its impact properties (Notched Izod impact strength at 23° C., multiaxial impact strength at −20° C.), as compared to an article molded from a composition having bisphenol A polycarbonates of the same number average molecular weights, and a drop in tensile modulus that is less than 150 MPa. The results also show that these inventive compositions exhibit an improved melt viscosity that is at least 15% lower, as compared to a composition having bisphenol A polycarbonates of the same number average molecular weights. The results also show that an article molded from the composition retains at least 80% of its impact properties (Notched Izod impact strength at 23° C., multiaxial impact strength at −20° C.), as compared to an article molded from a composition having bisphenol A polycarbonates of the same number average molecular weights, and that such an article molded from the composition also exhibits a drop in tensile modulus that is less than 150 MPa.

More specifically, the compositions of Examples 1 and 2 have a tensile modulus between 2700 and 2800 MPa, a melt viscosity significantly below 200 Pa·s, and excellent impact properties (Notched Izod impact strength at 23° C. above 45 kJ/m$^2$, multiaxial Impact Strength at −20° C. above 100 J and strain to break above 100%).

The tensile modulus and impact properties (Notched Izod impact strength at 23° C., multiaxial impact strength at −20° C.) of the compositions of Examples 1 and 2 are comparable to those of Comparative Example 3. Comparative Example 3 is based on Bisphenol A polycarbonate and is optimized for impact performance at a tensile modulus of about 2800 MPa, by using mainly high molecular weight polycarbonate and PBT resin (PBT315). However, Examples 1 and 2 have a significantly better (about 50% lower) melt viscosity (below 200 Pa·s) than Comparative Example 3 (330, Pa·s,) at similar impact properties (Notched Izod impact strength at 23° C., multiaxial impact strength at −20° C.). Therefore, the balance of flow and impact properties is superior for Examples 1 and 2.

Comparative Example 4 shows that by optimization of the formulation with respect to polymer molecular weight and contents of talc and impact modifier, the flow can be improved compared to Comparative Example 3 without compromising impact properties (Notched Izod impact strength at 23° C., multiaxial impact strength at −20° C.). However, the melt viscosity is still significantly higher (230 Pa·s) than for Examples 1 and 2 (below 200 Pa·s), which demonstrates that the use of the combination of PC-HFD copolymers results in a unique balance of impact and flow properties.

Comparative Example 5 demonstrates the effect of lowering the molecular weight of bisphenol A polycarbonate in the composition by exchanging PC105 polycarbonate with lower molecular weight PC175 polycarbonate, compared to Comparative Example 4. This is a commonly practiced method to improve the flow properties of a polymer composition. In Comparative Example 5, this results in a decrease in melt viscosity (195 Pa·s) compared to Comparative Example 4 (230 Pa·s), but not as advantageous as for Example 1 and 2, and poor impact properties, such as Notched Izod Impact Strength at 23° C. (18 kJ/m$^2$), multiaxial impact strength at −20° C. (70 J), and strain to break (15%), compared to both Examples 1 and 2 and Comparative Example 4.

Comparative Example 6 shows that the addition of a polybutylene terephthalate (PBT) oligomer (PBT R350) as a flow promoter results in similar trends, i.e. improved flow characteristics (180 Pa·s) compared to Comparative Example 4 (230 Pa·s), similar to Examples 1 and 2, and poorer impact properties, as measured by Notched Izod Impact Strength at 23° C. (18 kJ/m$^2$), MAI at −20° C. (50 J), and strain to break (20%), than Examples 1 and 2. Consequently, the use of the combination of PC-HFD copolymers is demonstrated to outperform standard methods to improve flow properties, including replacing high molecular weight with low molecular weight polycarbonate or addition of a flow promoter, because the impact properties are better retained.

Comparative Examples 7 and 8 show that the use of only high and low molecular weight PC-HFD does not give a similarly advantageous combination of properties as for Examples 1 and 2, which employ a combination of high and low molecular weight PC-HFD. Comparative Example 7 shows that using only low molecular weight PC-HFD results in improved flow characteristics (150 Pa·s) compared to Comparative Example 3 (330 Pa·s), and slightly better than Examples 1 and 2 (190 and 180 Pa·s). However, the impact properties, including Notched Izod impact strength at 23° C. (17 kJ/m$^2$), multiaxial impact strength at −20° C. (80 J), and strain to break (15%), are significantly worse than for Examples 1 and 2. Comparative Example 8 shows that the use of only the high molecular weight PC-HFD provides higher melt viscosity (215 Pa·s) although impact properties are similar to for Examples 1 and 2 (Notched Izod impact strength at 23° C. of 54 kJ/m$^2$, multiaxial impact strength at −20° C. of 100 J), and strain to break of 120%). This demonstrates that the use of a combination of low and high molecular weight PC-HFD provides a uniquely improved balance of flow and impact properties.

FIG. 1 compares the Notched Izod impact strength at room temperature as a function of melt viscosity for compositions with flow improvements using conventional approaches (variations in polycarbonate and PBT molecular weight and using PBT R350 as a flow promoter) compared to using PC-HFD polyestercarbonate, at a tensile modulus level of 2700-2800 MPa. FIG. 1 demonstrates that melt viscosity at which the ductile-to-brittle transition occurs is shifted to significantly lower values for the compositions with PC-HFD replacing the Bisphenol A polycarbonate than for lowering molecular weights or the addition of a flow promoter. Thus, the superior performance of using PC-HFD compared to conventional methods to improve flow characteristics of such thermoplastic compositions is demonstrated.

Examples 9 and 10 and Comparative Examples 11-14

The purpose of Examples 9 and 10 is to demonstrate that a unique balance of flow and impact properties with PC-HFD blocked polyestercarbonate in mineral filled and impact modified polycarbonate-polybutylene terephthalate blends is also achieved at higher filler loadings (7-8 wt %) to achieve a higher tensile modulus of 3000-3100 MPa. Comparative Examples 11-14 show comparative formulations that do not yield the unique property profile of the compositions of Examples 9 and 10. Furthermore, Comparative Example 14 shows that PC-HFD copolymers have a superior performance property compared to other polycarbonate copolymers, such as polycarbonate-polysiloxane copolymer (PC-EXL), which is known for its enhanced impact performance compared to regular bisphenol A polycarbonate.

Table 4 summarizes the compositions employed in Examples 9 and 10 and Comparative Examples 11-14.

TABLE 4

Formulations of Examples 9-10 and Comparative Examples 11-14

| Component | EX. 9 | EX. 10 | C. EX. 11 | C. EX. 12 | C. EX. 13 | C. EX. 14 |
|---|---|---|---|---|---|---|
| PBT315 | | | 28.35 | | 28.35 | 26.99 |
| PBT 195 | 34.25 | 34.25 | 8.34 | 34.25 | 8.34 | 7.94 |
| PC175 | | | | 21.80 | | |
| PC105 | | | 46.7 | 21.80 | | |
| PC-EXL | | | | | | 44.46 |
| PC-HFD HIGH | 21.80 | 14.53 | | | | |
| PC-HFD LOW | 21.80 | 29.06 | | | 46.7 | |
| JETFINE TALC | 8.00 | 8.00 | 7.00 | 8.00 | 7.00 | 7.00 |
| TSAN | 1.50 | 1.50 | 2.00 | 1.50 | 2.00 | 2.00 |
| AO1010 | 0.10 | 0.10 | 0.08 | 0.10 | 0.08 | 0.08 |
| PELTP | 0.05 | 0.05 | 0.05 | 0.05 | 0.05 | 0.05 |

TABLE 4-continued

Formulations of Examples 9-10 and Comparative Examples 11-14

| Component | EX. 9 | EX. 10 | C. EX. 11 | C. EX. 12 | C. EX. 13 | C. EX. 14 |
|---|---|---|---|---|---|---|
| PETS | 0.30 | 0.30 | 0.30 | 0.30 | 0.30 | 0.30 |
| $H_3PO_3$ | 0.21 | 0.21 | 0.18 | 0.21 | 0.18 | 0.18 |
| MBS | 12.00 | 12.00 | 7.00 | 12.00 | 7.00 | 11.00 |
| Melt viscosity | 195 | 185 | 330 | 230 | 180 | 210 |
| INI AT 23° C. | 49 | 36 | 40 | 43 | 17 | 60 |
| MAI AT 23° C. | 120 | 120 | 110 | 120 | 120 | 100 |
| MAI AT −20° C. | 100 | 80 | 100 | 100 | 50 | 80 |
| Tensile modulus | 2970 | 2990 | 3200 | 3100 | 3040 | 2280 |

The results in Table 4 show again that a combination of high and low molecular weight PC-HFD polymer composition instead of regular bisphenol A polycarbonate provides an improved melt viscosity that is 210 Pa·s (at 265° C. and 1500 s$^{-1}$) or lower and an article molded from the composition retains at least 80% of its impact properties (Notched Izod Impact Strength at 23° C. and multiaxial impact strength at −20° C.), as compared to an article molded from a composition having bisphenol A polycarbonates of the same number average molecular weights, and an article molded from the composition exhibits a drop in tensile modulus that is less than 150 MPa. These results also show that these compositions have an improved melt viscosity that is at least 15% lower, as compared to a composition having bisphenol A polycarbonates of the same number average molecular weights, and an article molded from the composition retains at least 80% of its impact properties (Notched Izod Impact Strength at 23° C. and multiaxial impact strength at −20° C.), as compared to an article molded from a composition having bisphenol A polycarbonates of the same number average molecular weights, and also that such an article molded from the composition exhibits a drop in tensile modulus that is less than 150 MPa, as compared to an article molded from a composition having bisphenol A polycarbonates of the same number average molecular weights.

The results obtained evidence that the compositions according to the present invention also work for compositions with a higher tensile modulus (higher filler loadings). Specifically, Examples 9 and 10 show that compositions using the PC-HFD copolymers in these mineral filled and impact modified compositions, specifically when low and high molecular weight resins are combined, have a low melt viscosity below 200 Pa·s, Notched Izod Impact Strength at 23° C. of 35-50 kJ/m$^2$ (ductile break) and multiaxial impact strength at −20° C. of 80 J and higher, while achieving a tensile modulus around 3000 MPa.

Comparative Example 11 is based on regular Bisphenol A polycarbonate, and is optimized for impact performance, by using mainly high Mw polycarbonate (PC105) and PBT (PBT315) resins. Therefore, Comparative Example 11 has relatively good impact properties (Notched Izod Impact Strength at 23° C. of 40 kJ/m$^2$ and multiaxial impact strength at −20° C. of 100 J), comparable to the Examples 9 and 10 of the invention. However, the melt viscosity is significantly higher (330 Pa·s) comparable to Examples 9 and 10 (below 200 Pa·s). This demonstrates that using PC-HFD copolymers instead of regular Bisphenol A polycarbonate improves the flow of the compositions significantly without significantly compromising the impact properties. Therefore, the balance of flow and impact properties is significantly superior for Examples 9 and 10 compared to Comparative Example 3.

Comparative Example 12 shows that by optimization of these compositions with respect to resin molecular weight and contents of talc and impact modifier, the flow of the composition can be improved (230 Pa·s) compared to Comparative Example 11 (330 Pa·s) without compromising impact properties (Notched Izod Impact Strength at 23° C. of 43 kJ/m$^2$ and multiaxial impact strength at −20° C. of 100 J). However, the melt viscosity is still significantly higher than for Examples 9 and 10, which demonstrates again that the use of PC-HFD copolymers results in a uniquely advantageous balance of impact and flow properties.

Comparative Example 13 shows that the use of only low molecular weight PC-HFD does not provide a similarly advantageous combination of properties as for Examples 9 and 10. Comparative Example 13 shows that using only low molecular weight PC-HFD polyester-carbonate block copolymer results in improved flow characteristics (180 Pa·s) compared to Comparative Example 12 (330 Pa·s), and slightly better than Examples 9 and 10 (195 and 185 Pa·s). However, the impact properties, including Notched Izod Impact Strength at 23° C. (17 kJ/m$^2$) and multiaxial impact strength at −20° C. (50 J), are significantly worse than for Examples 9 and 10. This demonstrates that the use of a combination of low and high molecular weight PC-HFD polyester-carbonate block copolymer provides a uniquely advantageous balance of flow and impact properties.

In Comparative Example 14, high molecular weight polycarbonate-polysiloxane copolymer (PC-EXL) is used instead of PC-HFD polyester-carbonate block copolymer. PC-EXL is a polycarbonate copolymer that is known to have a better balance of impact and flow properties compared to regular bisphenol A polycarbonate. Although the balance of flow and impact properties is improved for Comparative Example 14 compared to Comparative Example 12, the melt viscosity is somewhat higher (210 Pa·s) than for Examples 9 and 10, with comparable impact properties (Notched Izod Impact Strength at 23° C. of 60 kJ/m$^2$) and multiaxial impact strength at −20° C. of 80 J). However, the main deficiency of using PC-EXL is that the tensile modulus is lowered significantly (only 2280 MPa) compared to Comparative Example 12 and Examples 9 and 10 (all about 3000 MPa). This again demonstrates that PC-HFD copolymer yields a unique property profile in these compositions.

Figure 2:
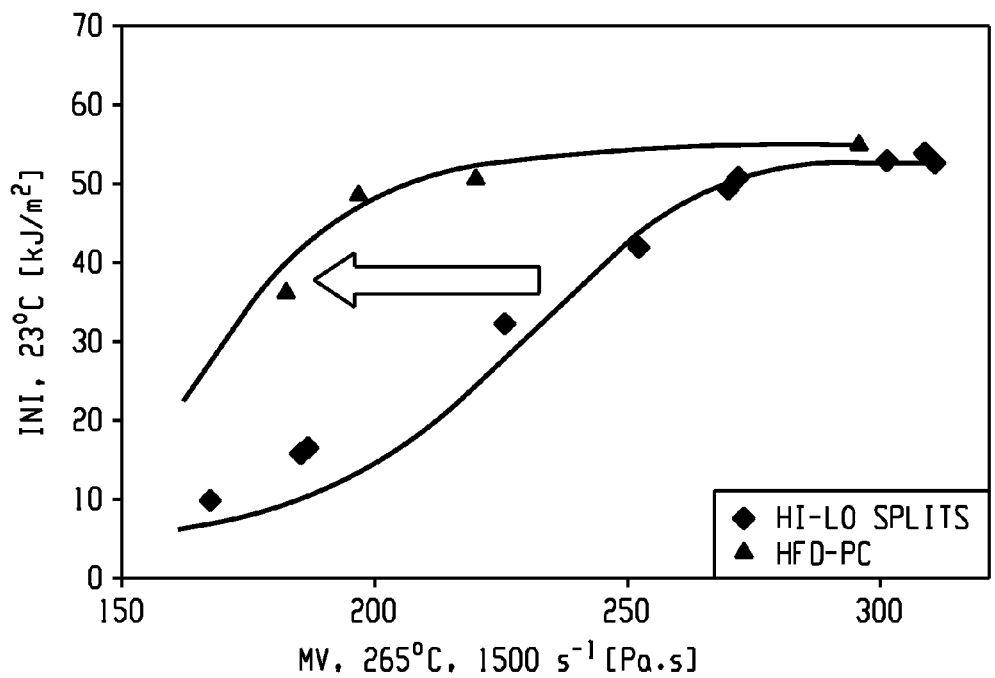
FIG. 2 is a plot of the impact-melt viscosity balance for comparative compositions (♦) and inventive compositions (▲; "HFD-PC") of Example 2 with a tensile modulus of 3000 to 3100 MP, in which inventive compositions a copolyestercarbonate is blended with polybutylene terephthalate.

FIG. 2 compares the Notched Izod Impact Strength at 23° C. as a function of melt viscosity (265° C., 1500 s$^{-1}$) for compositions with flow improvements using conventional approaches (variations in polycarbonate and PBT molecular weight) and using or PC-HFD at a tensile modulus level of 3000 MPa. Specifically, FIG. 2 demonstrates that melt viscosity at which the ductile-to-brittle transition occurs is shifted to significantly lower values for the compositions with PC-HFD copolymer replacing the bisphenol A polycarbonate than for lowering molecular weights or the addition of a flow promoter, resulting in superior performance of compositions using the combination of PC-HFD copolymers over conventional methods to improve flow characteristics of such thermoplastic compositions.

Examples 15 and 16 and Comparative Examples 17 and 18

The purpose of Examples 15 and 16 is to demonstrate that a unique balance of flow and impact properties with PC-HFD in mineral filled and impact modified polycarbonate-polybutylene terephthalate blends is also achieved at even higher filler loadings (15 wt %) to achieve a higher tensile modulus of 3700-3800 MPa. Comparative Examples 17 and 18 shows comparative compositions that do not yield the unique property profile of the compositions of Examples 9 and 10.

Table 5 summarizes the compositions employed in Examples 9 and 10 and Comparative Examples 17 and 18.

TABLE 5

Formulations of Examples 15-16 and Comparative Example 17-18

| Component | EX. 15 | EX. 16 | C. EX. 17 | C. EX. 18 |
|---|---|---|---|---|
| PBT315 |  |  | 7.830 |  |
| PBT 195 | 31.073 | 31.073 | 26.610 | 31.073 |
| PC175 |  |  |  | 19.774 |
| PC105 |  |  | 43.830 | 19.774 |
| PC-HFD HIGH | 19.774 | 13.181 |  |  |
| PC-HFD LOW | 19.774 | 26.365 |  |  |
| JETFINE TALC | 15.000 | 15.000 | 12.000 | 15.000 |
| TSAN | 1.500 | 1.500 | 2.000 | 1.500 |
| AO1010 | 0.100 | 0.100 | 0.080 | 0.100 |
| PELTP | 0.050 | 0.050 | 0.050 | 0.050 |
| PETS | 0.300 | 0.300 | 0.300 | 0.300 |
| H3PO3 | 0.430 | 0.430 | 0.300 | 0.430 |
| MBS | 12.00 | 12.00 | 7.00 | 12.00 |
| Melt viscosity | 205 | 185 | 330 | 235 |
| INI AT 23° C. | 18 | 13 | 20 | 18 |
| MAI AT 23° C. | 75 | 65 | 100 | 75 |
| MAI AT −20° C. | 55 | 50 | 60 | 50 |
| Tensile modulus | 3750 | 3800 | 3850 | 3870 |

The results in Table 6 demonstrate that the present invention also applies to compositions with very high filler loadings (15 wt. %) and a high tensile modulus of about 3800 MPa. Again, the use of PC-HFD copolymers in these mineral filled and impact modified compositions results in low melt viscosity around or below 200 Pa·s, and relatively good impact properties (Notched Izod Impact Strength at 23° C. of 10-20 kJ/m² and multiaxial impact strength at +23° C. of 70 J and at −20° C. around 50 J), for Examples 15 and 16, while achieving a tensile modulus around 3800 MPa.

Comparative Example 17 is based on regular bisphenol A polycarbonate, and is optimized for impact performance by using mainly high molecular weight polycarbonate (PC105) and PBT resin (PBT315). Therefore, Comparative Example 17 has good impact properties, comparable (Notched Izod Impact Strength at 23° C. of 20 kJ/m² and multiaxial impact strength at −20° C. of 60 J) or somewhat better (multiaxial impact strength at −20° C. of 100 J) than Examples 15 and 16. However, the melt viscosity is significantly higher (330 Pa·s) than for Examples 15 and 16 (205 and 185 Pa·s). This demonstrates that using PC-HFD copolymers instead of regular bisphenol A polycarbonate improves the flow of the compositions significantly without compromising the impact properties. Therefore, the balance of flow and impact properties is significantly better for Examples 15 and 16.

Comparative Example 18 shows that by optimization of the formulation for the composition with respect to resin molecular weight and contents of talc and impact modifier, the flow can be improved (230 Pa·s) compared to Comparative Example 17 (330 Pa·s) without compromising impact properties too much (Notched Izod Impact Strength at 23° C. of 18 kJ/m² and multiaxial impact strength at +23° C. of 75 J and at −20° C. of 50 J). However, the flow properties remain significantly less compared to Examples 15 and 16. Therefore, the balance of flow and impact properties is significantly better for Examples 15 and 16.

Examples 19 and Comparative Examples 20, 21 and 22

The purpose of Example 19 is to demonstrate that a uniquely advantageous balance of flow and impact properties with PC-HFD copolymers in mineral filled and impact modified polycarbonate-polybutylene terephthalate compositions is also achieved at a tensile modulus around 4000 MPa (filler loadings of about 18 wt %). Comparative Examples 20-22 show comparative compositions that do not yield this unique property profile.

Table 6 summarizes the compositions employed in Example 19 and Comparative Examples 20-22.

TABLE 6

Formulations of Example 19 and Comparative Examples 20-22

| Component | EX. 19 | C. EX. 20 | C. EX. 21 | C. EX. 22 |
|---|---|---|---|---|
| PBT315 | 14.87 | 14.87 | 29.74 | 29.74 |
| PBT 195 | 14.87 | 14.87 |  |  |
| PC175 |  | 18.93 | 37.86 |  |
| PC105 |  | 18.93 |  |  |
| PC-HFD HIGH | 18.93 |  |  |  |
| PC-HFD LOW | 18.93 |  |  | 37.86 |
| JETFINE TALC | 18 | 18 | 18 | 18 |
| TSAN | 1.5 | 1.5 | 1.5 | 1.5 |
| AO1010 | 0.1 | 0.1 | 0.1 | 0.1 |
| PELTP | 0.05 | 0.05 | 0.05 | 0.05 |
| PETS | 0.3 | 0.3 | 0.3 | 0.3 |
| H3PO3 | 0.45 | 0.45 | 0.45 | 0.45 |
| BS | 12 | 12 | 12 | 12 |
| Melt viscosity | 230 | 280 | 190 | 170 |
| INI AT 23° C. | 21 | 19 | 11 | 11 |
| MAI AT 23° C. | 105 | 100 | 90 | 90 |
| MAI AT −20° C. | 80 | 80 | 40 | 45 |
| Tensile modulus | 4040 | 4100 | 4140 | 4090 |

The results in Table 8 demonstrate the invention applies to compositions at very high filler loadings (18 wt %) and a tensile modulus of 4000-4100 MPa. Again, the use of PC-HFD copolymers in these mineral filled and impact modified compositions results in a low melt viscosity (around 230 Pa·s), and relatively good impact properties (Notched Izod Impact Strength at 23° C. of 21 kJ/m² and multiaxial impact strength at +23° C. of 105 J and at −20° C. of 80 J), as shown for Example 19, while achieving a tensile modulus of 4040 MPa.

Comparative Example 20 has the same formulation as Example 19, the only difference being the type of polycarbonate, bisphenol A polycarbonate instead of the PC-HFD copolymer for Example 19. Comparative Example 20 has similar impact properties (Notched Izod Impact Strength at 23° C. of 19 kJ/m² and multiaxial impact strength at +23° C. of 100 J and at −20° C. of 80 J) and tensile modulus (4100 MPa) as Example 19, but significantly higher melt viscosity (280 Pa·s). This once again demonstrates that using PC-HFD copolymer instead of regular bisphenol A polycarbonate provides a unique balance of flow, impact and modulus properties.

Comparative Example 21 shows that using low molecular weight polycarbonate resin results in improved flow properties (190 Pa·s), but a significant deterioration in impact properties (Notched Izod Impact Strength at 23° C. of 11 kJ/m² and multiaxial impact strength at +23° C. of 90 J and at −20° C. of 40 J) compared to Comparative Example 20 and Example 19. Similar trends are obtained for Comparative Example 22, where only low molecular weight PC-HFD copolymer is used, with a low melt viscosity (170 Pa·s), but deteriorated impact properties (Notched Izod Impact Strength at 23° C. of 11 kJ/m² and multiaxial impact strength at +23° C. of 90 J and at −20° C. of 45 J). This once again demonstrates that using PC-HFD copolymer instead of regular bisphenol A polycarbonate provides a unique balance of flow, impact and modulus properties.

All references are incorporated herein by reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition comprising, based on the total weight of the composition:
   (a) from 10 to 80 wt. % of a polybutylene terephthalate;
   (b) from 10 to 80 wt. % of a copolyestercarbonate component, comprising
   a first copolyestercarbonate having a number average molecular weight of 15,000 to less than 28,000 Daltons, and
   a second copolyestercarbonate having a number average molecular weight of more than 28,000 to 40,000 Daltons,
   wherein a weight ratio of the first polyestercarbonate to the second polyestercarbonate is 75:25 to 25:75, and
   wherein each copolyestercarbonate comprises structural estercarbonate units of the formula:

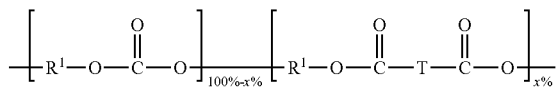

wherein
   each $R^1$ is independently the same or different $C_{6-30}$ aromatic group,
   each T is independently the same or different $C_{2-16}$ alkylene group, and
   x is the mole % of ester units in the copolyestercarbonate based on the total mole % of ester and carbonate units and is 5 to 10, wherein the ester and carbonate units represent at least 90 mole % of the polyestercarbonate;
   (c) from 3 to 30 wt. % of a particulate filler;
   (d) from 0.1 to 10 wt. % of a fluoropolymer;
   (e) from 3 to 25 wt. % of a polymeric impact modifier;
   (f) from 0 to 5 wt. % of an additive selected from the group consisting of an antioxidant, mold release agent, colorant, quencher, stabilizer, and combination thereof; and
   (g) from 0 to 30 wt. % of a polycarbonate;
wherein melt viscosity is at least 15% lower, as compared to a composition in which the first and second copolyestercarbonates are replaced by bisphenol A polycarbonates of the same number average molecular weights, wherein the melt viscosity is less than 230 Pa·s, as determined in accordance with ISO 11443 at 265° C. at a shear rate of 1500 s$^{-1}$ and wherein a 4-mm thick bar molded from the composition retains at least 80% of its notched Izod impact strength, as determined in accordance with ISO 180 at 23° C., as compared to the same composition in which the first and second copolyestercarbonates are replaced by bisphenol A polycarbonates of the same number average molecular weights.

2. The composition of claim 1, comprising from 3 to 20 wt. % of the particulate filler, from 5 to 25 wt. % of the second copolyestercarbonate copolymer, and from 20 to 40 wt. % of the first copolyestercarbonate.

3. The composition of claim 1, wherein the composition has a filler content ranging from 3 to 10 weight %, a melt viscosity that is 210 Pa·s or less, as determined in accordance with ISO 11443 at 265° C. at a shear rate of 1500 s$^{-1}$, wherein a bar molded from the composition has a notched Izod impact strength of greater than 25 KJ/m$^2$, as determined in accordance with ISO 180 at 23° C.

4. The composition of claim 1, wherein the composition has a filler content ranging from 10 to 20 weight %, wherein a 4.0 mm thick bar molded from the composition has a notched Izod impact strength of greater than 13 KJ/m$^2$, as determined in accordance with ISO 180 at 23° C.

5. The composition of claim 1, wherein an article molded from the composition exhibits a drop in tensile modulus that is less than 150 MPa, as determined in accordance with ISO 527, compared to the same composition in which the first and second copolyestercarbonates are replaced by bisphenol A polycarbonates of the same average number molecular weights.

6. The composition of claim 1, having a weight ratio of the polybutylene terephthalate to polyestercarbonate component of 70:30 to 30:70.

7. The composition of claim 1, wherein the first copolyestercarbonate has a number average molecular weight of 18,000 to 25,000 Daltons, and the second copolyestercarbonate has a number average molecular weight of 31,000 to 39,000 Daltons.

8. The composition of claim 1, wherein each $R^1$ of the first and second copolyestercarbonates is independently derived from a dihydroxy compound of the formula

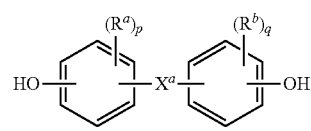

wherein $R^a$ and $R^b$ each represent a halogen or $C_{1-12}$ alkyl group and can be the same or different; p and q are each independently integers of 0 to 4; and $X^a$ is a single bond, —O—, —S—, —S(O)—, —S(O)$_2$—, —C(O)—, or a $C_{1-18}$ organic group.

9. The composition of claim 1, wherein each $R^1$ is derived from bisphenol A.

10. The composition of claim 1, wherein T is a $C_{7-11}$ alkylene group.

11. The composition of claim 1, wherein $R^1$ is derived from bisphenol A and T is a linear $C_8$ alkylene or a linear $C_{10}$ alkylene.

12. The composition of claim 1, further comprising a polycarbonate, wherein the polycarbonate is a bisphenol A polycarbonate.

13. The composition of claim 1, wherein the particulate filler is calcium carbonate, mica, kaolin, talc, glass, magnesium carbonate, sulfates of barium, calcium sulfate, titanium, nanoclay, silica, hydroxides of aluminum or ammonium or magnesium, zirconia, nanoscale titania, aluminum silicate, calcined clay, calcium silicate, clay, crushed quartz, diatomaceous earth, fly ash, limestone, silicates, titanium dioxide, wollastonite, zirconium oxide, zirconium silicate, or a combination thereof.

14. The composition of claim 13, wherein the particulate filler is a talc having an average particle diameter of 0.3 to 3 micrometers.

15. The composition of claim 1 wherein the fluoropolymer is a fibrillated fluoropolymer.

16. The composition of claim 1, wherein the fluoropolymer is encapsulated by a styrene-acrylonitrile copolymer, acrylonitrile-butadiene-styrene copolymer, alpha-alkyl-styrene-acrylonitrile copolymer, methyl methacrylate, styrene-butadiene rubber, polystyrene, poly-alpha-alkystyrene, polybutadiene, or a combination thereof.

17. The composition of claim 1, wherein the impact modifier is a core-shell polymer, and is a methyl(meth)acrylate-butadiene-styrene, acrylonitrile-styrene-acrylate, acrylonitrile-butadiene-styrene, butyl acrylate, ethyl acrylates, or combination thereof.

18. The composition of claim 1, wherein the impact modifier is a methyl methacrylate-butadiene-styrene or acrylic copolymer.

19. The composition of claim 1, further comprising from 0.1 to 30 wt. % of a polycarbonate.

20. A method of making the composition of claim 1, comprising melt blending the components of claim 1.

21. An article comprising the composition of claim 1.

22. The article of claim 21 comprising a component of a vehicle.

23. The article of claim 22, wherein the component is selected from the group consisting of door components, spoilers, tank flaps, rocker panels, side panels, trim, fenders, lids, hoods, roofs, bumpers, fascia, grilles, wheel components, frames, lamps, racks, and running boards.

24. The article of claim 21, wherein the article is an enclosure for an electrical, electronic, or telecommunication device.

25. The article of claim 24 wherein the article is a component of a power tool, home appliance, computer, computer accessory, or telephone.

26. A method of making an article, comprising shaping the composition of claim 1 by injection molding, extrusion molding, rotation molding, foam molding, calendar molding, blow molding, thermoforming, compaction, or melt spinning the melt blended composition to form the article.

27. A composition comprising, based on the total weight of the composition:
(a) from 20 to 70 wt. % of a polybutylene terephthalate;
(b) from 20 to 70 wt. % of a copolyestercarbonate component, comprising
a first copolyestercarbonate having a number average molecular weight of 18,000 to less than 25,000 Daltons, and
a second copolyestercarbonate having a number average molecular weight of more than 32,000 to 38,000 Daltons,
wherein a weight ratio of the first polyestercarbonate to the second polyestercarbonate is 75:25 to 25:75 and
wherein each copolyestercarbonate comprises structural estercarbonate units of the formula

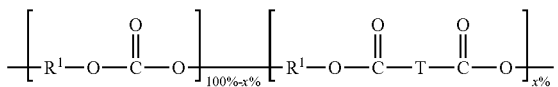

wherein
$R^1$ is a residue of bisphenol A,
T is a $C_{7-11}$ alkylene group, and
x is the mole % of ester units in the copolyestercarbonate based on the total mole % of ester and carbonate units and is 5 to 10, wherein the ester and carbonate units represent at least 90 mole % of the polyestercarbonate;
(c) from 5 to 15 wt. % of mica, talc, or a combination thereof;
(d) from 0.1 to 10 wt. % of a fibrillated polytetrafluoroethylene encapsulated with styrene-acrylonitrile;
(e) from 4 to 20 wt. % of a core-shell polymeric impact modifier;
(f) optionally, from 0.05 to 5 wt. % each of an antioxidant, a mold release agent, and a quencher; and
(g) optionally, from 1 to 30 wt. % of a bisphenol A polycarbonate;
wherein melt viscosity is at least 15% lower, as compared to a composition in which the first and second copolyestercarbonates are replaced by bisphenol A polycarbonates of the same number average molecular weights, wherein the melt viscosity is less than 230 Pa·s, as determined in accordance with ISO 11443 at 265° C. at a shear rate of 1500 s$^{-1}$ and wherein a 4-mm thick bar molded from the composition retains at least 80% of its notched Izod impact strength, as determined in accordance with ISO 180 at 23° C., as compared to the same composition in which the first and second copolyestercarbonates are replaced by bisphenol A polycarbonates of the same number average molecular weights.

* * * * *